(12) United States Patent
Chiang et al.

(10) Patent No.: US 8,601,370 B2
(45) Date of Patent: Dec. 3, 2013

(54) SYSTEM AND METHOD FOR ORGANIZING ICONS FOR APPLICATIONS ON A MOBILE DEVICE

(75) Inventors: Hui Yu Chiang, Burnaby (CA); Sherryl Lee Lorraine Scott, Toronto (CA); Alen Mujkic, Mississauga (CA); Jose Jose Rojas Ealo, Toronto (CA); Julian Paas, Mississauga (CA)

(73) Assignee: Blackberry Limited, Waterloo (CA)

( * ) Notice: Subject to any disclaimer, the term of this patent is extended or adjusted under 35 U.S.C. 154(b) by 1043 days.

(21) Appl. No.: 11/669,404

(22) Filed: Jan. 31, 2007

(65) Prior Publication Data
US 2008/0184112 A1     Jul. 31, 2008

(51) Int. Cl.
*G06F 3/00*     (2006.01)

(52) U.S. Cl.
USPC .......................................................... 715/700

(58) Field of Classification Search
USPC ........................... 715/747, 446, 811; 345/589
See application file for complete search history.

(56) References Cited

U.S. PATENT DOCUMENTS

| | | | |
|---|---|---|---|
| 6,484,189 B1 * | 11/2002 | Gerlach et al. ................ | 715/201 |
| 7,209,949 B2 * | 4/2007 | Mousseau et al. ............. | 709/206 |
| 7,466,320 B2 * | 12/2008 | Bocking ........................ | 345/589 |
| 2002/0054113 A1 | 5/2002 | Conrad et al. | |
| 2003/0013483 A1 | 1/2003 | Ausems | |
| 2003/0142125 A1 | 7/2003 | Salmimaa | |
| 2005/0015410 A1 | 1/2005 | Sato | |
| 2005/0050474 A1 * | 3/2005 | Bells et al. ..................... | 715/747 |
| 2005/0119031 A1 * | 6/2005 | Spalink et al. ................. | 455/566 |
| 2006/0101350 A1 * | 5/2006 | Scott ............................... | 715/779 |
| 2007/0083827 A1 * | 4/2007 | Scott et al. ..................... | 715/811 |
| 2007/0099657 A1 * | 5/2007 | Scott ............................ | 455/556.2 |
| 2008/0148182 A1 * | 6/2008 | Chiang et al. ................ | 715/810 |

FOREIGN PATENT DOCUMENTS

| | | |
|---|---|---|
| EP | 0443768 A | 8/1991 |
| EP | 0488925 A | 6/1992 |
| EP | 1677182 A | 7/2006 |
| WO | WO 98/44406 A2 | 10/1998 |
| WO | WO 01/61443 A | 8/2001 |

OTHER PUBLICATIONS

European Search Report (EP07101532), Jul. 23, 2007, European Patent Office.
"Device for Easy Point-and-Drag and Point-and-Click Applications"; IBM Technical Disclosure Bulletin; Aug. 1995; p. 163; vol. 38, No. 8.

* cited by examiner

*Primary Examiner* — Boris Pesin
*Assistant Examiner* — Henry Vuu
(74) *Attorney, Agent, or Firm* — Brett J. Slaney; Blake, Cassels & Graydon LLP (57) ABSTRACT

A method for moving icons on a display of a mobile device, either on the display or into a folder is provided. When an icon has been selected to be moved, its appearance is altered with respect to the other icons so as to provide a visual cue to the user regarding the move and the altered icon is overlaid on the other icons as it moves thereover. The icon may be displayed with a move cursor indicating where the icon will be placed if the current position is selected. A method is also provided for creating new folders on the display using a dialog box that is configured to enable a name and icon for the folder to be chosen and/or selected. Default names and folder icons may be used and alternative icons may also be presented in the dialog box to enable a preview of the choices.

29 Claims, 6 Drawing Sheets

SYSTEM AND METHOD FOR ORGANIZING ICONS FOR APPLICATIONS ON A MOBILE DEVICE

TECHNICAL FIELD

The following relates generally to systems and methods for organizing icons for applications on a mobile device, in particular for moving icons and creating folders for such icons.

DESCRIPTION OF THE PRIOR ART

Computer applications stored on a mobile device are typically accessible to a user via an operating system of a computing device. Most often, the applications are initiated by selecting an icon or other visual or graphical identifying element associated with the applications. The icons are presented on a display of the mobile device and can be selected using a positioning or input mechanism. The icons can be organized into folders, which themselves are represented visually on the display using icons, and the arrangement of the icons and the folders can be visualized on one or more screens.

It is often desired by the user to organize the icons representing the applications by moving or grouping icons and/or deleting and adding folders etc. Typically, menus and sub-menus or separate applications are used to organize the icons into folders or in a particular arrangement on the display, and to create specific folders for specific applications, where these operations may be cumbersome and/or unfamiliar to the user. Moreover, for each change in the organization of the icons, the display may often be refreshed in order to show the new arrangement, which can require several iterations before the user is satisfied.

For mobile devices, where the displays are relatively small and the interface mechanisms more limited, these disadvantages can be exacerbated. It is therefore an object of the following to obviate or mitigate at least one of the above disadvantages.

BRIEF DESCRIPTION OF THE DRAWINGS

Embodiments will now be described by way of example only with reference to the appended drawings wherein.

DETAILED DESCRIPTION OF THE DRAWINGS

Figure 1:
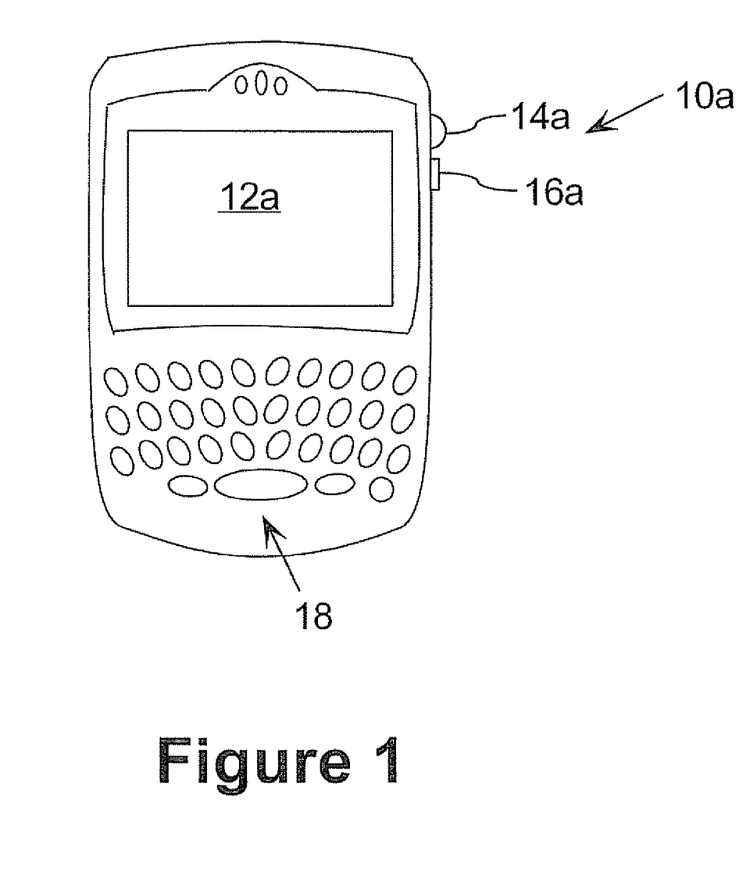
FIG. 1 is a schematic diagram of a mobile device.
Figure 2:
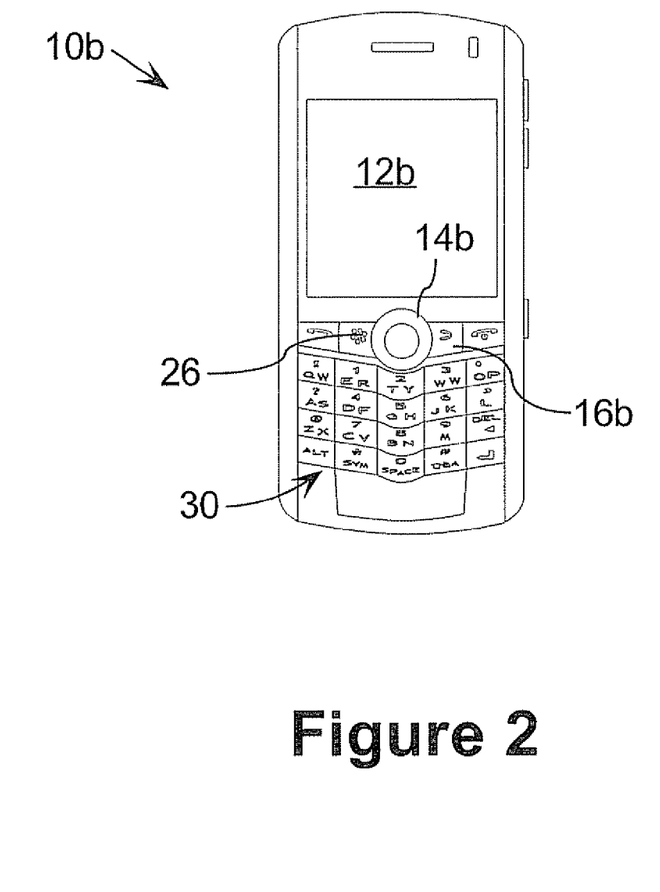
FIG. 2 is a schematic diagram of another mobile device.

Referring first to FIGS. 1 and 2, one embodiment of a mobile device 10a is shown in FIG. 1, and another embodiment of a mobile device 10b is shown in FIG. 2. It will be appreciated that reference numeral "10" will hereinafter refer to any mobile device 10, including the embodiments 10a and 10b. It will also be appreciated that a similar numbering convention may be used for other mobile device features common between FIGS. 1 and 2 such as a display 12, a positioning device 14, and a cancel or escape button 16.

The mobile device 10a shown in FIG. 1 comprises a display 12a and the cursor of view positioning device 14 shown in this embodiment is a positioning or scroll wheel 14a. Scroll wheel 14a may serve as another input member and is both rotatable to provide selection inputs to the processor 238 (see FIG. 3) and can also be pressed in a direction generally toward housing to provide another selection input to the processor 238. The display 12 (e.g. display 12a) may include a selection cursor 32 (see FIG. 5) that depicts generally where the next input or selection will be received. The mobile device 10a in FIG. 1 also comprises an escape or cancel button 16a and a keyboard 18. In this example, the keyboard 18 is disposed on the front face of the mobile device housing and positioning device 14 and cancel button 16a are disposed at the side of the housing to enable a user to manoeuvre the scroll wheel 14a while holding the mobile device 10a in one hand. The keyboard 18 is in this embodiment a standard QWERTY keyboard.

The mobile device 10b shown in FIG. 2 comprises a display 12b and the positioning device 14 in this embodiment is a trackball 14b. Trackball 14b permits many-directional positioning of the selection cursor 32 such that the selection cursor 32 can be moved in an upward direction, in a downward direction, in left and right directions and, if desired and/or permitted, in any diagonal direction. The trackball 14b is preferably situated on the front face of a housing for mobile device 10b as shown in FIG. 2 to enable a user to manoeuvre the trackball 14b while holding the mobile device 10b in one hand. The trackball 14b may serve as another input member (in addition to a directional or positioning member) to provide selection inputs to the processor 238 and can preferably be pressed in a direction towards the housing of the mobile device 10b to provide such a selection input.

Figure 5:
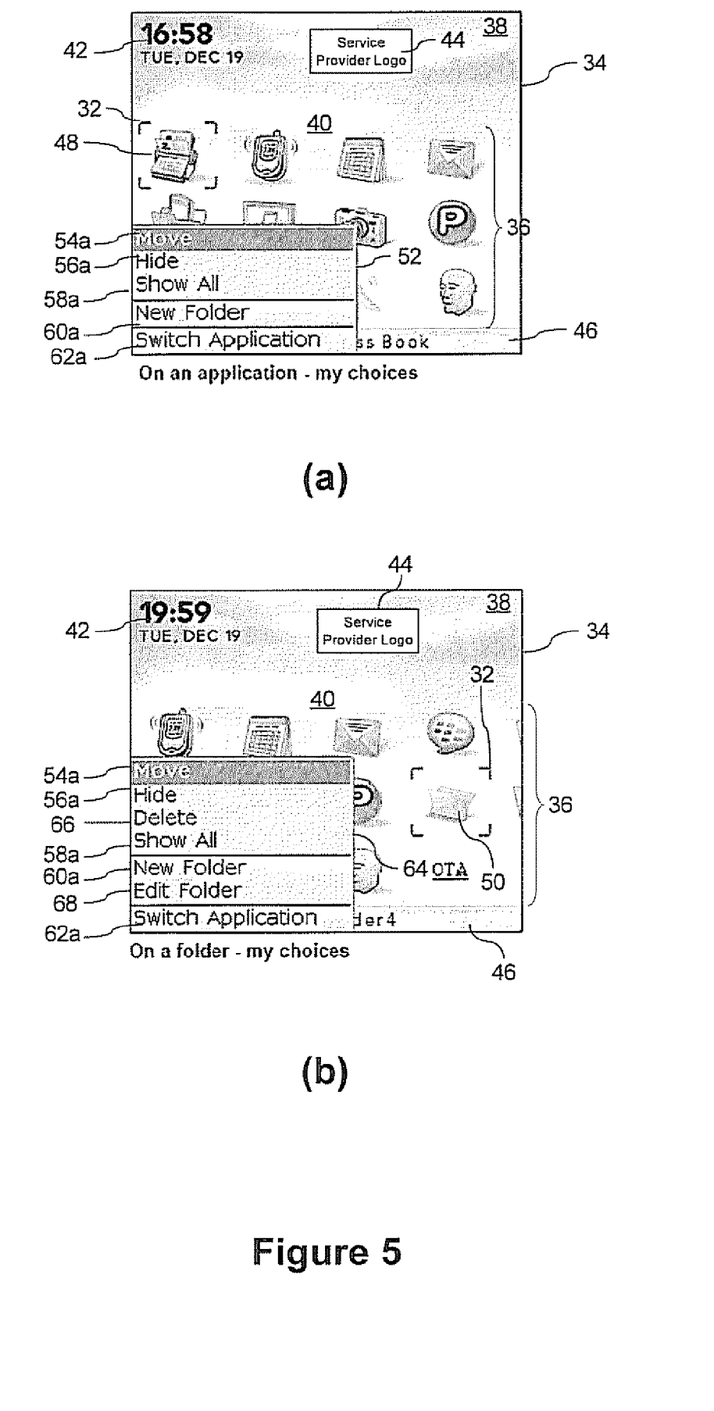
FIG. 5 is a pair of screen shots, the first screen shot illustrating a first menu displaying options for applications and the second screen shot illustrating a second menu displaying options for folders.

The mobile device 10b also comprises a menu or option button 26 that loads a menu or list of options on display 12b when pressed as shown in FIG. 5, and a cancel or escape button 16b to exit, "go back" or otherwise escape from a feature, option, selection or display. The mobile device 10b as illustrated in FIG. 2, comprises a reduced QWERTY keyboard 30. In this embodiment, the keyboard 30, positioning device 14, escape button 16b and menu button 26 are disposed on a front face of a mobile device housing.

The reduced QWERTY keyboard 30 comprises a plurality of multi-functional keys and corresponding indicia including keys associated with alphabetic characters corresponding to a QWERTY array of letters A to Z and an overlaid numeric phone key arrangement. The plurality of keys that comprise alphabetic and/or numeric characters total fewer than twenty-six (26). In the embodiment shown, the number of keys that comprise alphabetic and numeric characters is fourteen (14). In this embodiment, the total number of keys, including other functional keys, is twenty (20). The plurality of keys may comprise foul rows and five columns of keys, with the four mows comprising in order a first, second, third and fourth row, and the five columns comprising in order a first, second, third, fourth, and fifth column. The QWERTY array of letters is associated with three of the tour rows and the numeric phone key an arrangement is associated with each of the four rows.

The numeric phone key arrangement is associated with three of the five columns. Specifically, the numeric phone key arrangement may be associated with the second, third and fourth columns. The numeric phone key arrangement may alternatively be associated with keys in the first, second, third, and fourth rows, with keys in the first row including a number "1" in the second column, a number "2" in the third column, and a number "3" in the fourth column. The numeric phone keys associated with keys in the second row include a number "4" in the second column, a number "5" in the third column, and a number "6" in the fourth column. The numeric phone keys associated with keys in the third row include a number "7" in the second column, a number "8" in the third column, and a number "9" in the fourth column. The numeric phone keys associated with keys in the fourth row may include a "*" in the second column, a number "0" in the third column, and a "#" in the fourth column.

The physical keyboard may also include a function associated with at least one of the plurality of keys. The fourth row of keys may include an "alt" function in the first column, a "next" function in the second column, a "space" function in the third column, a "shift" function in the fourth column, and a "return/enter" function in the fifth column.

The first row of five keys may comprise keys corresponding in order to letters "QW", "ER", "TY", "UT", and "OP". The second row of five keys may comprise keys corresponding in order to letters "AS", "DF", "GH", "JK", and "L". The third row of five keys may comprise keys corresponding in order to letters "ZX", "CV", "BN", and "M".

It will be appreciated that for the mobile device 10, a wide range of one or more positioning or cursor/view positioning mechanisms such as a touch pad, a joystick button, a mouse, a touchscreen, set of arrow keys, a tablet or other whether presently known or unknown may be employed. Similarly, any variation of keyboard 18, 30 may be used. It will also be appreciated that the mobile devices 10 shown in FIGS. 1 and 2 are for illustrative purposes only and various other mobile devices 10, presently known or unknown are equally applicable to the following examples.

Figure 3:
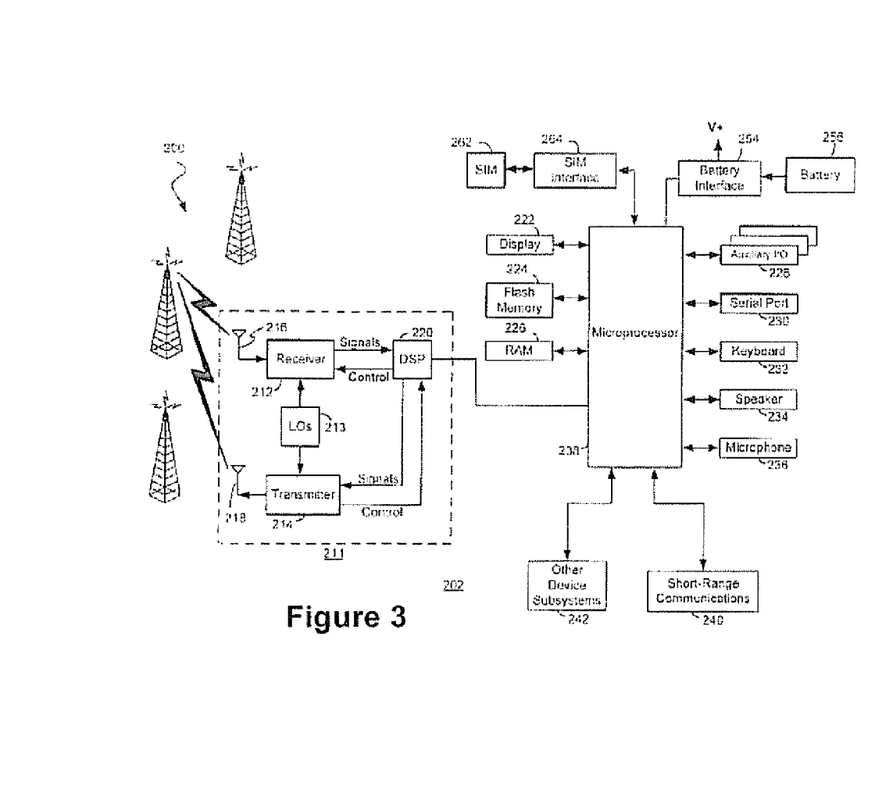
FIG. 3 is a schematic block diagram of components of the mobile device of FIGS. 1 and 2.

FIG. 3 is a detailed block diagram of a preferred mobile station 202 of the present disclosure. The term "mobile station" will herein refer to the operable components of, e.g. mobile device 10. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities)—e.g. mobile device 10 shown in FIGS. 1 and 2. Mobile station 202 may communicate with any one of a plurality of fixed transceiver stations 200 within its geographic coverage area.

Mobile station 202 will normally incorporate a communication subsystem 211 which includes a receiver 212, a transmitter 214, and associated components such as one or more (preferably embedded or internal) antenna elements 216 and 218, local oscillators (LOs) 213, and a processing module such as a digital signal processor (DSP) 220. As will be apparent to those skilled in field of communications, particular design of communication subsystem 211 depends on the communication network in which mobile station 202 is intended to operate.

Mobile station 202 may send and receive communication signals over a network after required network registration or activation procedures have been completed. Signals received by antenna 216 through the network are input to receiver 212, which may perform such common receiver functions as signal amplification, frequency down conversion, filtering, channel selection, and like, and in example shown in FIG. 3, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a Subscriber Identity Module or "SIM" card 262 to be inserted in a SIM interface 264 in order to operate in the network. SIM 262 is one type of a conventional "smart card" used to identify an end user (or subscriber) of the mobile station 202 and to personalize the device, among other things. Without SIM 262, the mobile station terminal is not fully operational for communication through a wireless network. By inserting SIM 262 into mobile station 202, an end user can have access to any and all of his/her subscribed services. SIM 262 generally includes a processor and memory for storing information. Since SIM 262 is coupled to a SIM interface 264, it is coupled to microprocessor 238 through communication lines. In order to identify the subscriber, SIM 262 contains some user parameters such as an International Mobile Subscriber Identity (IMSI). An advantage of using SIM 262 is that end users are not necessarily bound by any single physical mobile station. SIM 262 may store additional user information for the mobile station as well, including datebook (or calendar) information and recent call information.

Mobile station 202 is a battery-powered device so it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown) which provides a regulated voltage V to all of the circuitry.

Mobile station 202 includes a microprocessor 238 which controls overall operation of mobile station 202. Communication functions, including at least data and voice communications are performed through communication subsystem 211. Microprocessor 238 also interacts with additional device subsystems such as a display 222, a flash memory 224, a random access memory (RAM) 226, auxiliary input/output subsystems 228, a serial port 230, a keyboard 232, a speaker 234, a microphone 236, a short-range communications subsystem 240, and any other device subsystems generally designated at 242. Some of the subsystems shown in FIG. 3 perform communication-related functions, whereas other subsystems may provide "resident" or on-device functions. Notably, some subsystems such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, as well as the inventive functionality of the present disclosure, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 262 to facilitate storage of PIM data items and other information.

The PIM application preferably has the ability to send and receive data items via the wireless network. In the present disclosure, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 3 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 3 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Turning now to FIG. 5, the mobile device 10 displays a home screen 34, which is preferably the active screen when the mobile device 10 is powered up and constitutes the main ribbon application. The home screen 34 generally comprises a status region 38 and a theme background 40, which provides a graphical background for the display 12. The theme background 40 displays a series of icons 36 that are associated with particular applications stored in memory 224 on the device and are displayed in a predefined arrangement over a graphical background.

In some themes, the home screen 34 may limit the number icons 36 shown on the home screen 34 so as to not detract from the theme background 40, particularly where the background 40 is chosen for aesthetic reasons. The theme background 40 shown in FIG. 5 provides a grid of icons. In other themes (e.g. see FIG. 8), a limited list of icons may be displayed in a column (or row) on the home screen along one portion of the display 12. In yet another theme, the entire list of icons may be listed in a continuous row along one side of the home screen on the display 12 enabling the user to scroll through the list while maintaining a limited number of currently visible icons on the display 12. In yet another theme (not shown), metadata may be displayed with each of a limited number of icons shown on the home screen. For example, the next two appointments in the user's calendar may be accessed by the processor 238 and displayed next to the calendar icon. It will be appreciated that many themes are available for the user to select and that any applicable arrangement may be used and/or created.

One or more of the series of icons 36 is typically a folder (e.g. folder icon 50 shown in screen (b) of FIG. 5) that itself is capable of organizing any number of applications therewithin. The processor 238 is configured to display a corresponding folder view for each folder on the display 12, and a "folder view" for the home screen 34 which may be referred to as a root folder or a root view. Each folder has a corresponding folder icon 50, which may be customized as will be explained in greater detail below. As will also be explained in greater detail below, an escape icon 78 may also be displayed within a folder for enabling movement out of a current folder view to the previous folder view. Similarly, selection of the folder icon 50 updates the display 12 to show the corresponding folder view.

The status region 38 in this embodiment comprises a date/time display 42 and an optional service provider logo 44. The theme background 40, in addition to a graphical background and the series of icons 36, also comprises a status bar 46. The status bar 46 provides information to the user based on the location of the selection cursor 32, e.g. by displaying a name for the icon 36 that is currently being highlighted or "in focus".

An application, such as a contacts application 430 (see FIG. 4 described below), may then be initiated (opened or viewed) from display 12 by highlighting a contacts icon 48 using the positioning device 14 and providing a suitable user input to the mobile device 10. For example, contacts application 430 may be initiated by moving the positioning device 14 such that the contacts icon 48 is highlighted as shown in screen (a) of FIG. 5, and providing a selection input, e.g. by pressing the trackball 14b.

Movement, navigation, and/or scrolling with use of a cursor/view positioning device 14 (e.g. trackball 14b or scroll wheel 14a) is beneficial given the relatively large size of visually displayed information and the compact size of display 12, and since information and messages are typically only partially presented in the limited view of display 12 at any given moment. As previously described, positioning device 14—scroll wheel 14a and trackball 14b, are helpful cursor/view positioning mechanisms to achieve such movement. Positioning device 14, which may be referred to as a scroll wheel or scroll device 14a in one embodiment (FIG. 1), specifically includes a circular disc which is rotatable about a fixed axis of housing and may be rotated by the end user's index finger or thumb. As noted above, in another embodiment (FIG. 2) the trackball 14b comprises a many-directional member that enables upward, downward, left and right, and if desired, diagonal movements. The many-directional movements afforded, in particular, by the trackball 14b and the presentation of the grid of icons 36 and folders 50 provides the user with flexibility and familiarity of the layout of a traditional desktop computer interface. Also, the positioning device 14 enables movement and selection operations to be executed on the mobile device 10 using one hand. The trackball 14b in particular also enables both one-handed use and the ability to cause the cursor 32 to traverse the display 12 in many directions and would not be constrained to bi-directional navigation.

Figure 4:
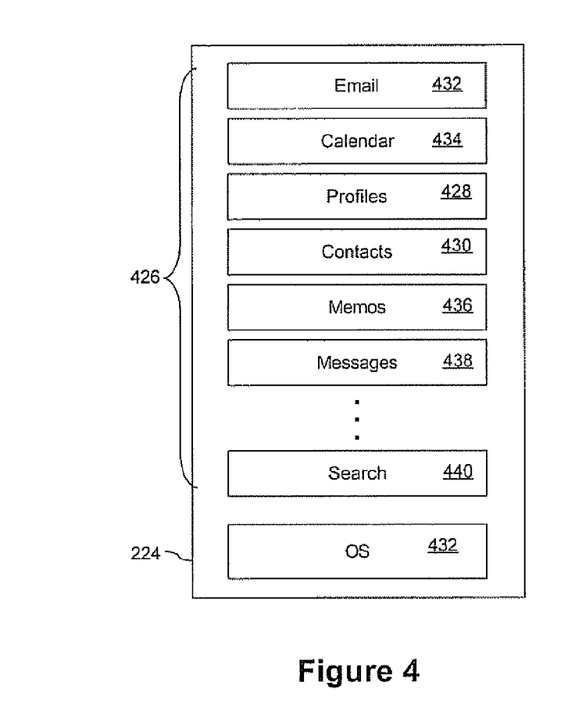
FIG. 4 is a schematic block diagram of the memory shown in FIG. 3.

As shown in FIG. 4, memory 224 includes a plurality of applications 426 associated with the series of icons 36 for the processing of data. Applications 426 may be any variety of forms such as, without limitation, software, firmware, and the like. Applications 426 may include, for example, the contacts application 430, electronic mail (e-mail) 432, calendar program 434, memo program 436, messages 438, search 440 etc. An operating system (OS) 432 also resides in memory 224. The mobile devices 10 of the present disclosure are also configured to enable communication between different ones of the applications, e.g. between contacts application 430 and the email application 432. Also, the icons 36 for the applications on the devices 10 can be modified, named, moved, sorted and otherwise interacted with for the purposes of organizing and/or manipulating the visibility of the icons for those applications 426.

Turning back to FIG. 5, screen (a) illustrates a first menu 52 (in this example named "my choices") which is initiated and displayed by the processor 238 in response to an appropriate input from the user. In this embodiment, the first menu 52 is displayed when the user highlights an icon for an application 426 with the selection cursor 32 using the positioning device 14, and provides an appropriate input, e.g. by pressing the menu button 26. The first menu 52 may also be displayed upon the user pressing the scroll wheel 14a or trackball 14b. It will be appreciated that the first menu 52 may be initiated and loaded in response to any suitable input mechanism using any suitable positioning device 14.

The first menu 52 lists a number of choices or options for the user. As shown in screen (a), the first menu 52 provides a move option 54a which enables the user to instruct the processor 238 to move the selected icon (e.g. contacts icon 48) within the current screen (e.g. home screen 34) or into a folder represented by a folder icon 50 on that screen. The first menu 52 also provides a hide option 56a for visually concealing the selected icons and a show all option 58a for revealing or "un-hiding" any currently hidden icons. The first menu 52 also provides a new folder option 60a, which enables the user to create and name a folder as will be explained in greater detail below. The first menu 52 also provides a switch application option 62a (which is similar to the functionality provided by pressing ALT+TAB on a desktop computer) to display which applications are open and available to the user on the mobile device 10 at that time.

Screen (b) shown in FIG. 5 illustrates a second menu 64 which is initiated and displayed by the processor 238 when the focus of the selection cursor 32 is on a folder (e.g. folder icon 50 as shown) and the menu button 26 is pressed by the user (or by way of any other suitable input mechanism as discussed above). The second menu 64 provides a list of choices or options applicable to a folder. Similar options with respect to screen (a) are given like numerals with the suffix "b". The second menu 64 provides a move option 54b, hide option 56b and show all option 58b similar to the first menu 52. The second menu 64 also provides a delete option 66 for deleting the selected folder (e.g. folder icon 50 shown in screen (b)), a new folder option 60b similar to the first menu 52, and an edit folder option 68 for changing properties or identifiers for the folder such as the name, its representative icon etc. The second menu 64 also provides a switch application option 62b that operates similar to the first menu 52.

It will be appreciated that in the following description, like elements, options etc. with respect to FIG. 5 are given like numerals where the element, option etc. is the same and similar elements, options etc. in different embodiments or contexts are given like numerals with the prefix 1, 2, 3 etc.

Figure 6:
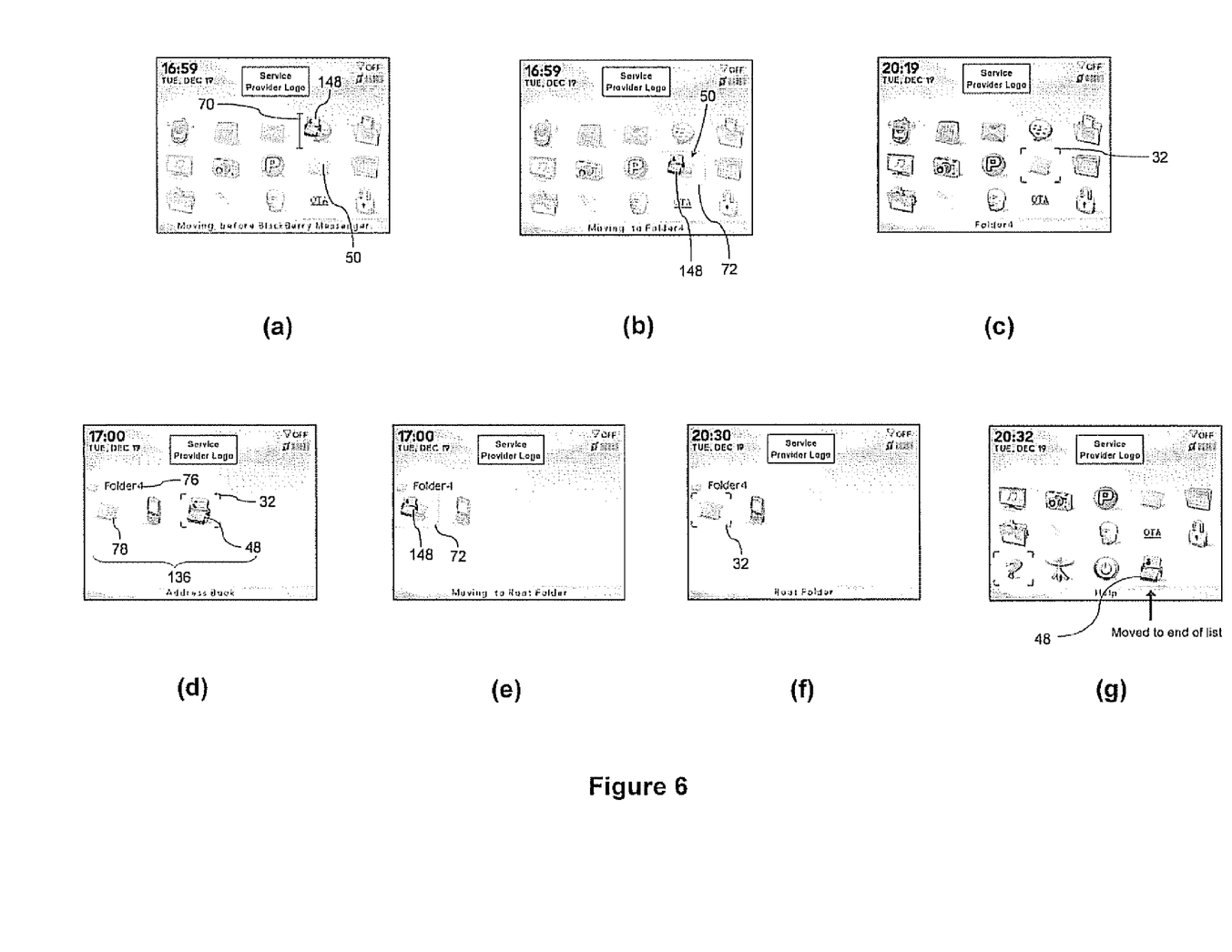
FIG. 6 is a series of screen shots illustrating steps performed in moving an icon for an application on a display of the mobile device of FIG. 1 and/or FIG. 2.

Referring now to FIG. 6, an example is provided illustrating execution of steps that are performed after selecting the move option 54a in the first menu 52. The following example begins with screen (a) shown in FIG. 5. The user first positions the selection cursor 32 on the contacts icon 48 using the positioning device 14, and selects the menu button 26. This input instructs the processor 238 to load the first menu 52 enabling the user to then select the move option 54a by, e.g., pressing the trackball 14b or scrollwheel 14a.

Once the user has selected the move option 54a, the processor 238 then displays a move cursor 70 and a smaller version of the contacts icon 148. The smaller contacts icon 148 is used to provide a visual cue to the user to indicate that the move option 54a has been selected. As can be seen in screen (a), the smaller contacts icon 148 is overlaid on the other icons 36 and thus the contacts icon 48 is "pulled" out of its position and altered in appearance (e.g. by reducing its size), which further emphasizes the move operation.

Once the contacts icon 48 is "pulled" out of its position and its appearance altered as discussed above, the other icons 36 are shifted to "fill in" the region of space on the home screen 34 where the contacts icon 48 was previously displayed (see screen (a) of FIG. 5) so that no empty regions exist on the home screen 34. As seen in screen (a) of FIG. 6, the icons 36 are shifted such that the previous position for the contacts icon 48 is occupied by the mobile phone icon and the others shifted "up" or "back" by one space. As noted above, the combined move cursor 70 and smaller contacts icon 148 are temporarily overlaid on the other icons 36 during the move operation. It will be appreciated that the icons 36 may instead be shifted after the move operation if desired or at another other appropriate time and should not be limited to the examples described herein.

In this example, the icons 36 are also locked in their current positions after they have been shifted and until the move operation is completed. By locking the other icons 36, the move operation is even further emphasized for the user to provide a greater sense of control over the movement and organization of the icons 36.

By selecting the cancel or escape button 16, the user may cancel execution of the move operation which then restores the arrangement of the icons 36 as displayed prior to the menu selection. In other words, if the escape button 16 is pressed during the move operation, the contacts icon 48 would be placed back in its position on the home screen 34 shown in FIG. 5, screen (a).

In this example, the move cursor 70 is positioned to the left of the smaller contacts icon 148 which indicates that if an appropriate input is received, the contacts icon 48 will be repositioned to the left of (i.e. "before") where the smaller contacts icon 148 is currently overlaid. It will be appreciated that the move cursor 70 may also be positioned at any predefined location relative to the item in focus, e.g., to the right, below or above the smaller contacts icon 148. The move cursor 70 (or any equivalent thereof) indicates that upon receiving an appropriate input, the icon (e.g. contacts icon 48) will be placed in the respective position relative to the icon 36 that is currently being overlaid (i.e. to place the icon 48 before, after, above, below etc.)

It will also be appreciated that the move cursor 70 may be embodied by any other suitable cursor or graphical element. Similarly, the move cursor 70 may be given a distinct colour and/or "blink" to draw further attention to the icon of interest.

As also shown, the status bar 46, during implementation of the move option 54a, displays a note to the user that indicates the action that would be executed by the processor 238 if the current position on the display 12 is selected. For example, in screen (a), pressing the trackball 14b or scrollwheel 14a would place the contacts icon 48 before (i.e. to the left) of the Blackberry Messenge™ icon.

To provide even further emphasis for the user during the move operation, the icons 36 that are not being moved are tinted down to a lower hue to appear "greyed-out" so as to emphasize that the icons 36 are locked. The lower hue also serves to draw attention to the smaller contacts icon 148 and the move cursor 70 which retain their default hue and appear brighter on the display 12.

Figure 9:
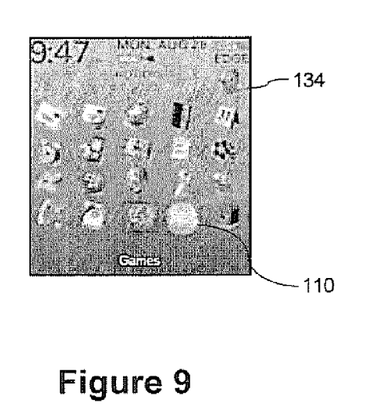
FIG. 9 is a screen shot illustrating yet another embodiment for moving an icon on a display of the mobile device of FIG. 1 and/or FIG. 2.

The contacts icon 48 may also be moved into a folder. As shown in screen (b), when the smaller contact icon 148 is overlaid on a folder icon 50, the move cursor 70 changes to a bounding box 72 to indicate that an appropriate input will place the contacts icon 48 into the folder represented by folder icon 50. The bounding box 72 visually distinguishes a move into a folder from a move relative to other icons 36 on the home screen 34 (or within the current folder if applicable). An addition symbol 110, also known as a plus sign "+" may also be displayed to emphasize that the contacts icon 48 will be added to the folder as shown in the home screen 134 of FIG. 9. When the user provides an appropriate input, e.g. by pressing the trackball 14b, the contacts icon 48 is moved into the folder.

As shown in screen (c), once the contacts icon 48 has been moved into the folder, the selection cursor 32 focuses on the folder icon 50 and the icons 36 retain their normal hue. The selection cursor 32 highlights the folder icon 50 to enable the user to immediately open the folder should they wish to move the contacts icon 48 within the folder for folder icon 50 or if they wish to remedy an undesired move. It will be appreciated that the processor 238 may instead automatically update the display 12 upon moving the contacts icon 48 into the folder for folder icon 50 to show the corresponding folder view while continuing to enable the contacts icon 48 to be moved within the folder view as shown in screen (d).

In this example, by selecting the folder icon 50 (e.g. by pressing the trackball 14b), the processor 238 updates or refreshes the display 12 to show the contents 74 of the folder view for folder icon 50 as illustrated in screen (d). A header 76 is displayed to identify the folder and in this example indicates that the folder is named "Folder4". A root folder icon or escape icon 78 and a list of icons 136 contained in the folder view are displayed, which comprises the contacts icon 48 that has just been moved.

If the user wishes to move the contacts icon 48 within or out of Folder4, the first menu 52 can be accessed by providing a suitable input (e.g. by pressing menu button 26) and selecting the move option 54 as described above and shown in FIG. 5, screen (a). Similar to when moving an icon 36 within the home screen, the smaller contacts icon 148 and the move cursor 70 are displayed and the other icons 136 greyed out and locked in their current positions. As shown in screen (e) when the smaller contacts icon 148 is overlaid on the root folder icon 78, the bounding box 72 is displayed which indicates that with an appropriate input, the contacts icon 48 will be moved to the root folder. The status bar 46 also displays to the user the outcome that would result from providing the appropriate input, e.g. "Moving to Root Folder".

Once the contacts icon 48 has been moved to the root folder as shown in screen (f), the cursor 32 highlights the escape icon 78 so that the user may then leave Folder4 and go back to the root folder, in this example the home screen 34. As shown in screen (g), the contacts icon 48 when moved back to the home screen is preferably placed at the end of the list of icons 36. It will be appreciated that folders may be moved into and out of another folder in a similar manner. It will also be appreciated that the processor 238 may instead automatically update the display 12 upon moving the contacts icon 48 into the corresponding folder to show the corresponding folder view while continuing to enable the contacts icon 48 to be moved within the root folder view, e.g. the home screen 34 as shown in screen (g). In this way, the user may continue to move the icon on the display between different folder views and within such folder views until they are satisfied with a desired position.

It can therefore be seen that the move option 54 enables the user to move and organize icons 36 and folders 50 with ease and flexibility. Moreover, the positioning device 14 enables the user to move the icons 36 using one hand and, the trackball 14b in particular also provides for many-directional movement. By providing the move cursor 32 (or bounding box 72 where appropriate), and by greying out the other icons 36 while locking them in place during execution of the move option 54, the processor 238 on the mobile device 10 enables the user to operate in a "moving mode" until they are satisfied with the position of the selected icon. The visual cues provided to the user also emphasize the actions being taken to provide the sense of greater control over the organization of the applications and their icons 36. Moreover, the use of the trackball 14b and its multidirectional movement capabilities provides even greater flexibility and control for the user.

Figure 7:
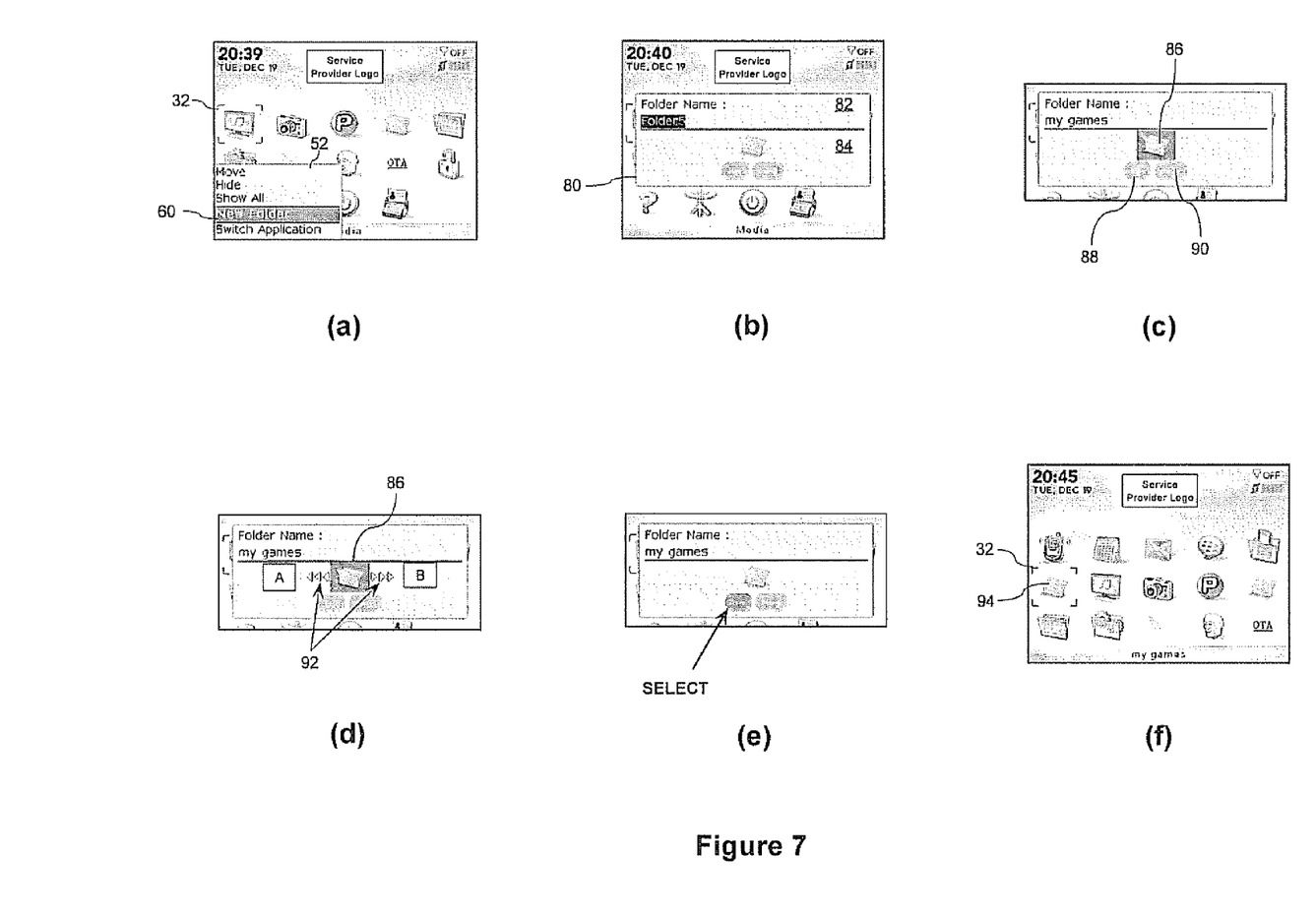
FIG. 7 is a series of screen shots illustrating steps performed in creating a folder on the display of the mobile device of FIG. 1 and/or FIG. 2.

Turning now to FIG. 7, an example is provided illustrating execution of the new folder option 60. Since the new folder option 60 is provided in both the first menu 52 and the second menu 64, by pressing the menu button 26 (or using any other suitable input mechanism such as by pressing the scrollwheel 14a or track-ball 14b) the user is able to select this option from any cursor position on the home screen 34.

When the new folder option 60 is selected as shown in screen (a), a folder name dialog box 80 is displayed by the processor 238 as shown in screen (b). The dialog box 80 comprises a name entry portion 82 and a folder icon portion 84. The name entry portion 82 provides a default string of characters for the folder name, preferably based on a sequential naming convention such as Folder1, Folder2 etc. In this example, the new folder is given the default name "Folder5" indicating that Folder1, Folder2, Folder3 and Folder4 already exist. The default name is highlighted which enables the user to begin typing the desired name and immediately overwrite the default name. In this example, the user names the folder "my games". If the default name is sufficient, the user may instead move the focus to the folder icon portion 84 without typing a new name.

The folder icon portion 84 displays a default folder icon 86 to represent the new folder as shown in screen (c), and also displays a save button 88 to enable the user to save the settings and a cancel button 90 to escape the new folder option 60 without creating the new folder. By providing an input, e.g. by pressing the scroll wheel 14a or trackball 14b, a pair of scroll arrows 92 is displayed that flank the folder icon 86. The scroll arrows 92 are used to indicate to the user that movement of the positioning device 14 "scrolls" or navigates between available icon previews, and enables selection of alternative icons to represent the new folder, e.g. icon A or icon B shown in screen (d). If there are no alternative icons stored in memory 224, typically nothing would be displayed alongside the scroll arrows 92. However, alternatively a message such as "Empty" or "No Alternatives" could be displayed. By moving the positioning device 14, one of the alternative icons may be shifted into focus in the dialog box 80. In this example, the default folder icon 86 is chosen by entering a suitable input (e.g. pressing trackball 14b or scroll wheel 14a) and selecting the save button 88 as shown in screen (e).

As shown in screen (f), the newly created my games folder 94 is then displayed and given focus with the selection cursor 32 by the processor 238, and is placed to the left of the icon that was highlighted when the first menu 52 was originally initiated. It will be appreciated that the new folder may be placed in any suitable location relative to the desired position at which it is placed and should not be limited to being placed to the left of the previously highlighted icon. For example, the new folder may instead be placed at the end of the series of icons 36, to the right of the previously highlighted icon, above, below etc.

It can therefore be seen that the dialog box 80 enables the user to create, name and associate a custom icon with a folder directly in the home screen 34 or within a folder view displayed upon selecting the folder icon 50 for that folder. Moreover, the alternative icons allow the user to associate the folder with a representative icon. For example, a folder for photos may be created with an icon that displays a photo or any other visual element or graphic that represents photography etc. Preferably, the user is able to load predefined alternative icons onto the mobile device 10 via communication subsystem 211. The user may also be able to create custom folder icons either directly on the mobile device 10 or on a desk-top computer (not shown), which then pushes or uploads the custom icon to the mobile device 10.

Figure 8:
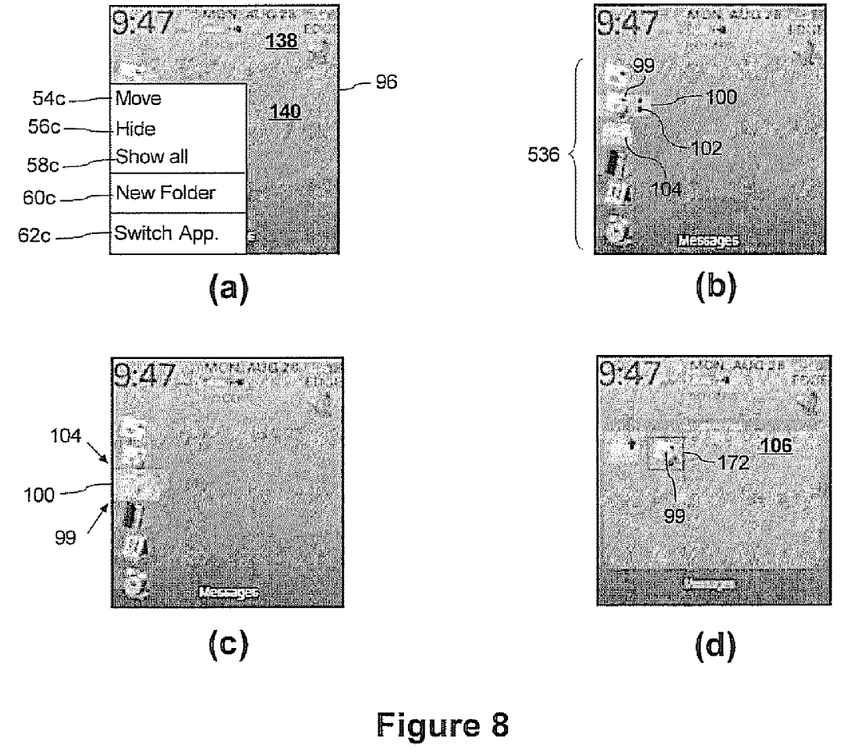
FIG. 8 is a series of screen shots illustrating another embodiment for moving an icon displayed on the mobile device of FIG. 1 and/or FIG. 2.

In another embodiment shown in FIG. 8, an alternate theme 96 is displayed on display 12 of the mobile device 10. In this embodiment, the theme 96 comprises a status region 138 and a graphical background 140. The theme 96 shown in FIG. 8 lists a series of icons 536 along the left side of the display 12 as shown in screen (b) so as to minimize the coverage of the graphical background 140. Referring now to screen (a) in FIG. 8, by providing a suitable input, a third menu 98 is loaded and displayed by the processor 238. The third menu 98 lists a move option 54c, hide option 56c, show all option 58c, new folder option 60c, and switch application (appl.) option 62c, similar to the other menus shown and described above.

In FIG. 8, the Blackberry Messenger icon 99 is highlighted and thus upon receiving a suitable input from the user, the third menu 98 is displayed. The user may then select the move option 54c, which then causes the processor 238 to highlight the icon 99 by displaying a bright band 100 behind the icon 99. The band 100 includes vertically oriented movement arrows 102. The movement arrows 102 are used to visually indicate to the user that the selected icon 99 can be moved in a particular direction, in this example, up or down along the list of icons 236. It will be appreciated that the move cursor 70, bounding box 72, or any other indicator may instead be used to visually indicate that the icon 98 is ready to be moved. Similarly, the other icons 236 may be greyed out and a smaller icon displayed (not shown). As such, any of the above principles may be used to provide the features described with respect to FIGS. 6 and 7.

In this embodiment, the user selects an "Accessories" folder 104 while the band 100 is overlaid thereon and the contents 106 of the accessories folder 104 is displayed by the processor 238. The bounding box 72 is focused on the Blackberry Messenger™ icon 99 so that it may be moved etc. by the user. The user may instead return to the root folder (e.g. home screen for theme 96) by highlighting and selecting the root folder icon 178.

By providing the dialog box 80 on the display 12 in the currently viewed screen (e.g. home screen 34) the user can add a folder directly to that screen providing a sense of control over the organization of the application icons 36 on the display 12 and thus a familiarity to the user.

It can therefore be seen that the layout of the icons 36 and the features provided for moving, adding, deleting etc. provides, on a mobile device 10, greater flexibility and control over such operations. In particular, the combination of features for displaying and providing inputs to the mobile device 10 affords greater flexibility and offers immediate feedback to the user once an action has been taken. Where display space and input devices are limited such as on mobile devices 10, the usability of the user interface can be greatly increased. Moreover, the visual cues such as the move cursor 70, bounding box 72, greying out of the icons 36, dialog box 80 etc. emphasize operations such as moving icons and creating folders to distinguish such operations from normal operation of the mobile device 10.

It will be appreciated that the particular options, outcomes, applications, screen shots and icons shown in the figures and described above are for illustrative purposes only and many other variations can be used according to the principles described.

Although the invention has been described with reference to certain specific embodiments, various modifications thereof will be apparent to those skilled in the art without departing from the spirit and scope of the invention as outlined in the claims appended hereto.

The invention claimed is:

1. A method for moving an icon on a display of a computing device between a plurality of folder views, each said plurality of folder views displaying the contents of a respective folder on said display, said method comprising:
 providing one or more application icons on said display in a current folder view, and at least one other icon being either a folder icon configured to enable movement into a corresponding folder view or an escape icon configured to enable movement out of said current folder view;
 enabling a focus to be placed on a first icon in said current folder view using a positioning device, said first icon being one of said plurality of icons;
 upon receiving a first input for selecting said first icon, displaying a menu within said current folder view and enabling selection of a move option from said menu;
 upon receiving a second input selecting said move option from said menu, returning to said current folder view by removing said menu from said display, providing a visual cue associated with said first icon to indicate that said move option has been selected for said first icon, and then enabling movement of said first icon on said display within said current folder view using said positioning device;
 upon the first icon overlaying a second icon, said second icon being one of said at least one other icon, visually distinguishing from a move relative to said one or more application icons by changing said visual cue to indicate that a third input will cause said first icon to be moved into or out of said current folder view; and
 upon receiving said third input:
  if said second icon is said folder icon, moving said first icon into said corresponding folder view, and updating said display to show the contents of said corresponding folder view while continuing to enable said first icon to be moved within said corresponding folder view to a desired location: and
  if said second icon is said escape icon, moving said first icon out of said current folder view, and updating said display to show the contents of said corresponding folder view while continuing to enable said first icon to be moved within said corresponding folder view to a desired location.

2. A method according to claim 1 wherein said second icon is said escape icon and said method further comprises updating said display to show the contents of another folder view while continuing to enable said first icon to be moved within said another folder view to said desired location.

3. A method according to claim 1 wherein said second icon is said folder icon and said method further comprises placing focus on said folder icon upon receiving said third input.

4. A method according to claim 1 wherein said second icon is said escape icon and said method further comprises placing focus on said escape icon upon receiving said third input.

5. A method according to claim 1 wherein providing said visual cue to indicate that the move option has been selected for said first icon comprises altering the appearance of said first icon with respect to the others of said plurality of icons.

6. A method according to claim 5 wherein upon receiving said second input, said method comprises locking the position of said others of said plurality of icons.

7. A method according to claim 5 wherein upon receiving said second input, said method comprises lowering the hue of said others of said icons with respect to said first icon.

8. A method according to claim 5 wherein said altering the appearance of said first icon comprises displaying an altered icon configured to be smaller in size than said first icon and configured to be overlaid on said others of said plurality of icons during movement thereof.

9. A method according to claim 5 wherein said altering the appearance of said one of said plurality of icons comprises displaying a move cursor therewith, said move cursor configured to indicate a predefined position for placing said first icon.

10. A method according to claim 9 wherein said move cursor is positioned to the left of said first icon on said display and said predefined position is before said second icon.

11. A method according to claim 10 wherein said plurality of icons is arranged in a grid on said display and said predefined position is to the left of said second icon.

12. A method according to claim 1 wherein if said second icon is said folder icon, said method comprises displaying a bounding box surrounding said first icon and said folder icon.

13. A method according to claim 1 wherein if said second icon is said folder icon, overlaying an addition symbol on said folder icon.

14. A method according to claim 1 wherein said plurality of icons is arranged in a column along one direction on said display and upon receiving said second input, displaying a pair of move arrows with said first icon indicating permissible movement directions.

15. A non-transitory computer readable storage medium comprising computer readable instructions for moving an icon on a display of a computing device between a plurality of folder views, each said plurality of folder views displaying the contents of a respective folder on said display, said computer readable medium comprising instructions for:
 providing one or more application icons on said display in a current folder view, and at least one other icon being either a folder icon configured to enable movement into a corresponding folder view or an escape icon configured to enable movement out of said current folder view;
 enabling a focus to be placed on a first icon in said current folder view using a positioning device, said first icon being one of said plurality of icons;
 upon receiving a first input for selecting said first icon, displaying a menu within said current folder view and enabling selection of a move option from said menu;
 upon receiving a second input selecting said move option from said menu, returning to said current folder view by removing said menu from said display, providing a visual cue associated with said first icon to indicate that said move option has been selected for said first icon, and then enabling movement of said first icon on said display within said current folder view using said positioning device;
 upon the first icon overlaying a second icon, said second icon being one of said at least one other icon, visually distinguishing from a move relative to said one or more application icons by changing said visual cue to indicate that a third input will cause said first icon to be moved into or out of said current folder view; and
 upon receiving said third input:
  if said second icon is said folder icon, moving said first icon into said corresponding folder view, and updating said display to show the contents of said corresponding folder view while continuing to enable said first icon to be moved within said corresponding folder view to a desired location; and
  if said second icon is said escape icon, moving said first icon out of said current folder view, and updating said display to show the contents of said corresponding folder view while continuing to enable said first icon to be moved within said corresponding folder view to a desired location.

16. A mobile device comprising a display configured to display a plurality of folder views, one or more input mechanisms, a positioning device and a processor configured for causing said mobile device to perform the method of claim 1.

17. The non-transitory computer readable storage medium according to claim 15 wherein said second icon is said escape icon and said computer readable storage medium further comprises instructions for updating said display to show the contents of another folder view while continuing to enable said first icon to be moved within said another folder view to said desired location.

18. The non-transitory computer readable storage medium according to claim 15 wherein said second icon is said folder icon and said computer readable storage medium further comprises instructions for placing focus on said folder icon upon receiving said third input.

19. The non-transitory computer readable storage medium according to claim 15 wherein said second icon is said escape icon and said computer readable storage medium further comprises instructions for placing focus on said escape icon upon receiving said third input.

20. The non-transitory computer readable storage medium according to claim 15 wherein providing said visual cue to indicate that the move option has been selected for said first icon comprises altering the appearance of said first icon with respect to the others of said plurality of icons.

21. The non-transitory computer readable storage medium according to claim 20 wherein upon receiving said second input, said computer readable storage medium comprises instructions for locking the position of said others of said plurality of icons.

22. The non-transitory computer readable storage medium according to claim 20 wherein upon receiving said second input, said computer readable storage medium comprises instructions for lowering the hue of said others of said icons with respect to said first icon.

23. The non-transitory computer readable storage medium according to claim 20 wherein said altering the appearance of said first icon comprises displaying an altered icon configured to be smaller in size than said first icon and configured to be overlaid on said others of said plurality of icons during movement thereof.

24. The non-transitory computer readable storage medium according to claim 20 wherein said altering the appearance of said one of said plurality of icons comprises displaying a move cursor therewith, said move cursor configured to indicate a predefined position for placing said first icon.

25. The non-transitory computer readable storage medium according to claim 24 wherein said move cursor is positioned to the left of said first icon on said display and said predefined position is before said second icon.

26. The non-transitory computer readable storage medium according to claim 25 wherein said plurality of icons is arranged in a grid on said display and said predefined position is to the left of said second icon.

27. The non-transitory computer readable storage medium according to claim 15 wherein said computer readable storage medium comprises instructions such that if said second icon is said folder icon, instructions are executed for displaying a bounding box surrounding said first icon and said folder icon.

28. The non-transitory computer readable storage medium according to claim 15 wherein if said second icon is said folder icon, said computer readable storage medium executes instructions for overlaying an addition symbol on said folder icon.

29. The non-transitory computer readable storage medium according to claim 15 wherein said plurality of icons is arranged in a column along one direction on said display and upon receiving said second input, said computer readable storage medium executes instructions for displaying a pair of move arrows with said first icon indicating permissible movement directions.

* * * * *